US008997007B1

(12) United States Patent  
Bennett et al.

(10) Patent No.: US 8,997,007 B1  
(45) Date of Patent: Mar. 31, 2015

(54) INDICATING AVAILABILITY FOR PARTICIPATION IN COMMUNICATION SESSION

(75) Inventors: David Scrymgeour Bennett, Issaquah, WA (US); Ujjwal Singh, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 12 days.

(21) Appl. No.: 13/526,291

(22) Filed: Jun. 18, 2012

Related U.S. Application Data

(60) Provisional application No. 61/497,923, filed on Jun. 16, 2011.

(51) Int. Cl.
```
G06F 3/00      (2006.01)
G06Q 10/10     (2012.01)
G06F 3/0481    (2013.01)
G06F 3/01      (2006.01)
H04N 7/15      (2006.01)
```

(52) U.S. Cl.
CPC ............. *G06Q 10/10* (2013.01); *G06F 3/0481* (2013.01); *H04N 7/15* (2013.01)
USPC ........................................................ 715/753

(58) Field of Classification Search
CPC ................ G06Q 50/01; G06F 17/3089; G06F 17/30873; G06F 17/30997
USPC ........................ 715/751, 752, 753, 757, 758
See application file for complete search history.

(56) References Cited

U.S. PATENT DOCUMENTS

| | | | |
|---|---|---|---|
| 5,793,365 A | 8/1998 | Tang et al. | |
| 5,880,731 A * | 3/1999 | Liles et al. | 715/758 |
| 7,620,902 B2 | 11/2009 | Manion et al. | |
| 7,752,553 B2 * | 7/2010 | Pennington et al. | 715/751 |
| 7,822,809 B2 | 10/2010 | Dhupelia et al. | |
| 7,865,566 B2 | 1/2011 | Ashtekar et al. | |
| 7,945,862 B2 * | 5/2011 | Aldrich et al. | 715/751 |
| 8,032,470 B1 * | 10/2011 | Heidenreich et al. | 706/45 |
| 8,538,895 B2 * | 9/2013 | Appelman et al. | 705/319 |

(Continued)

OTHER PUBLICATIONS

"Ruby on rails—Implementing an Online Waiting Room," [online]. First Accessed on Oct. 7, 2011. Retrieved from the Interne!: http://stackoverflow.com/questions/2669891/implementing-an-online-waiting-room, 2 pg.

(Continued)

*Primary Examiner* — Nicholas Augustine  
(74) *Attorney, Agent, or Firm* — Patent Law Works LLP

(57) ABSTRACT

In general, this disclosure describes techniques for a for indicating user availability comprising providing for display at a first client device, graphical representations associated with one or more users available to participate in a synchronous communication session that enables communication between different client devices, receiving, from the first client device, a selection of the graphical representations to engage with at least one second client device corresponding to the selected graphical representations in the synchronous communication session, and responsive to receiving the selection of the graphical representations, coupling the first client device to the synchronous communication session, wherein coupling the first client device to the synchronous communication session allows the first client device to communicate with at least the second client device associated with the at least one selected graphical representations, wherein at least the second client device is coupled to the synchronous communication session.

24 Claims, 5 Drawing Sheets

(56) References Cited

U.S. PATENT DOCUMENTS

| | | | |
|---|---|---|---|
| 8,560,606 B2* | 10/2013 | Chakra et al. | 709/204 |
| 2001/0048449 A1* | 12/2001 | Baker | 345/758 |
| 2002/0130904 A1* | 9/2002 | Becker et al. | 345/753 |
| 2003/0074451 A1 | 4/2003 | Parker et al. | |
| 2004/0186887 A1 | 9/2004 | Galli et al. | |
| 2004/0249811 A1 | 12/2004 | Shostack et al. | |
| 2004/0260781 A1 | 12/2004 | Shostack et al. | |
| 2005/0273503 A1 | 12/2005 | Carr et al. | |
| 2006/0031772 A1* | 2/2006 | Valeski | 715/751 |
| 2006/0098085 A1 | 5/2006 | Nichols | |
| 2006/0176831 A1 | 8/2006 | Greenberg et al. | |
| 2006/0182249 A1 | 8/2006 | Archambault et al. | |
| 2007/0050452 A1 | 3/2007 | Raju | |
| 2007/0071209 A1 | 3/2007 | Horvitz et al. | |
| 2007/0169165 A1 | 7/2007 | Crull et al. | |
| 2007/0208806 A1 | 9/2007 | Mordecai et al. | |
| 2007/0233291 A1 | 10/2007 | Herde et al. | |
| 2008/0070697 A1 | 3/2008 | Robinson et al. | |
| 2008/0140523 A1* | 6/2008 | Mahoney et al. | 705/14 |
| 2008/0201638 A1* | 8/2008 | Nair | 715/706 |
| 2008/0209339 A1* | 8/2008 | Macadaan et al. | 715/745 |
| 2008/0209351 A1* | 8/2008 | Macadaan et al. | 715/762 |
| 2008/0222533 A1 | 9/2008 | Hankejh et al. | |
| 2008/0260138 A1 | 10/2008 | Chen et al. | |
| 2009/0040289 A1 | 2/2009 | Hetherington et al. | |
| 2009/0063995 A1* | 3/2009 | Baron et al. | 715/753 |
| 2009/0222742 A1 | 9/2009 | Pelton et al. | |
| 2010/0057857 A1 | 3/2010 | Szeto | |
| 2010/0082693 A1 | 4/2010 | Hugg et al. | |
| 2010/0174783 A1 | 7/2010 | Zarom | |
| 2010/0192072 A1 | 7/2010 | Spataro et al. | |
| 2010/0203968 A1 | 8/2010 | Gill et al. | |
| 2010/0205541 A1* | 8/2010 | Rapaport et al. | 715/753 |
| 2010/0226288 A1 | 9/2010 | Scott et al. | |
| 2010/0241580 A1* | 9/2010 | Schleier-Smith | 705/319 |
| 2010/0257577 A1* | 10/2010 | Grandison et al. | 726/1 |
| 2011/0055309 A1 | 3/2011 | Gilbor et al. | |
| 2011/0106662 A1 | 5/2011 | Stinchcomb | |
| 2011/0107239 A1 | 5/2011 | Adoni et al. | |
| 2011/0185057 A1 | 7/2011 | Waugaman et al. | |
| 2011/0222466 A1 | 9/2011 | Pance et al. | |
| 2011/0269540 A1 | 11/2011 | Gillo et al. | |
| 2011/0271205 A1* | 11/2011 | Jones et al. | 715/753 |
| 2011/0300841 A1 | 12/2011 | Archambault et al. | |
| 2011/0319175 A1 | 12/2011 | Jensen | |
| 2011/0320373 A1* | 12/2011 | Lee et al. | 705/319 |

OTHER PUBLICATIONS

"TJN Chat Room—The Jazz Newwork Worldwide," [online]. First Accessed Dec. 5, 2011. Retrieved from the Interne!: http://www.thejazznetworkworldwide.com/group/tjnchatroom, 17 pgs.

Apple, Inc. Using your built-in iSight camera. Nov. 14, 2011. accessed on Aug. 5, 2013 from Internet http;//support.apple.com/kb/ht1462. p. 1-2.

Avchat Video Chat "AVChat Video Chat Features, Tons of Features, Insanely Flexible," [online]. First Accessed Aug. 18, 2011. Retrieved from the Internet!: http://avchal.nel/features.php, 4 pgs.

ichat excerpt from http://www.apple.com/macosx/apps/all.html#ichat, downloaded Jul. 11, 2011, 1 p.

Parkes, Skype for iPhone will run in the background with iPhone OS 4. Apr. 8, 2010. The Big Blog [online]. Retrieved from the Internet: http://blogs.skype.com/en/2010/04/skype_for_iphone_will_run_in_t.html.

Roseman et al., TeamRooms: Network Places for Collaboration. 1996. ACM, Computer Supported Cooperative Work '96. p. 325-33.

Weisz et al., "Watching Together: Integrating Text Chat With Video," CHI 2007 Proceedings—Video, Apr. 28-May 3, 2007, San Jose, CA, pp. 877-886.

Wikipedia page: SkypeTM, last modified Jul. 10, 2011. 22 pp.

Wikipedia page: Tinychat, last modified Jun. 15, 2011, 2 pp.

www.tinychat.com, "Video chat with friends & meet new ones from all around the world—today," downloaded Jul. 11, 2011. 18 pp.

\* cited by examiner

INDICATING AVAILABILITY FOR PARTICIPATION IN COMMUNICATION SESSION

This application claims the benefit of U.S. Provisional Application No. 61/497,923, filed Jun. 16, 2011, which is assigned to the assignee hereof and hereby expressly incorporated by reference herein.

TECHNICAL FIELD

The disclosure relates to selecting participants to engage in a communication session.

BACKGROUND

Various networks, such as the Internet, allow users located in separate physical locations to engage in communication sessions, such as text-based chat, real-time audio, and video communications. A user of a communication network wishing to communicate using one of these methods may generally only be able to communicate with those other users who are connected to the Internet, for example, using the same type of communication network. A user wishing to engage in a communication session with one or more other users may send a communication, such as an e-mail, chat message, or other form of communication, to the one or more other users to determine if any of those users are available to engage in a communications session.

SUMMARY

Techniques of this disclosure provide a method for indicating user availability comprising providing for display at a first client device, using one or more computing devices, one or more graphical representations associated with one or more users available to participate in a synchronous communication session that enables communication between different client devices. The method further comprises receiving, using the one or more computing devices, from the first client device, a selection of at least one of the one or more graphical representations to engage with at least one second client device corresponding to the at least one selected graphical representations in the synchronous communication session. Responsive to receiving the selection of the at least one of the one or more graphical representations, the one or more computing devices may couple the first client device to the synchronous communication session. Coupling the first client device to the synchronous communication session allows the first client device to communicate with at least the second client device associated with the at least one selected graphical representation, wherein at least the second client device is coupled to the synchronous communication session.

Another example provides a computer-readable storage medium comprising instructions for causing at least one programmable processor to perform operations. The operations may include providing for display at a first client device, using one or more computing devices, one or more graphical representations associated with one or more users available to participate in a synchronous communication session that enables communication between different client computing devices. The instructions may cause the one or more processors to further perform operations comprising receiving, using the one or more computing devices, from the first client device, a selection of one or more of the graphical representations to engage with at least one second client device corresponding to the at least one selected graphical representations in the synchronous communication session. Responsive to receiving the selection of the at least one of the one or more graphical representations, the at least one programmable processor may perform operations comprising coupling, using the one or more computing devices, the first client device to the synchronous communication session, wherein the synchronous communication allows the first client device to communicate with at least the second client device associated with the at least one selected graphical representation, wherein at least the second client device is coupled to the synchronous communication session.

Yet another example provides a computing device that includes a network interface to connect to a communication session that enables communication between different client devices. The computing device may further include a display device that displays one or more graphical representations associated with one or more users available to participate in a synchronous communication session. The computing device may also include an input device configured to receive, by a user interface of the computing device, a user input selecting at least one of the one or more graphical representations to engage with at least the second client device corresponding to the at least one selected graphical representations in the communication session. And, the computing device may also include one or more processors configured to join the synchronous communication session responsive to receiving the user input, wherein the one or more selected users are associated with the communication session.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

In accordance with common practice, the various described features are not drawn to scale and are drawn to emphasize features relevant to various embodiments. Like reference characters denote like elements throughout the figures and text.

DETAILED DESCRIPTION

Overview

Friends, family members, or other individuals who wish to socialize or otherwise communicate may not always be in the same physical location at the time they would like to communicate. Some individuals may rely upon telephonic, text, or other forms of communication that support limited forms of socializing. For example, conventional forms of communication, such as social networks, may support multi-way audio and/or video communication. When attempting to engage in such a communication session, it is sometimes difficult to determine when users of video, audio, or text-based communication are available to engage in these communication methods.

When a user is seeking to engage in a conversation, the user may select an option in an application to display a graphical list of people who may be associated with the user and available to engage in conversation. For example, the user may be using a social media application which displays a graphical list of the user's contacts or friends who are available. The graphical list of available people is also referred to herein as a "live bar." The live bar may contain graphical representations of one or more available users. Some of these graphical representations may include still images, including portraits of the available users or icons, and videos, including live video feeds of the available users if these users have enabled video cameras. The user may select one or more of the graphical representations included in the live bar to invite the one or more corresponding available users represented on the live bar to a synchronous communication session.

Example Systems

Figure 1:
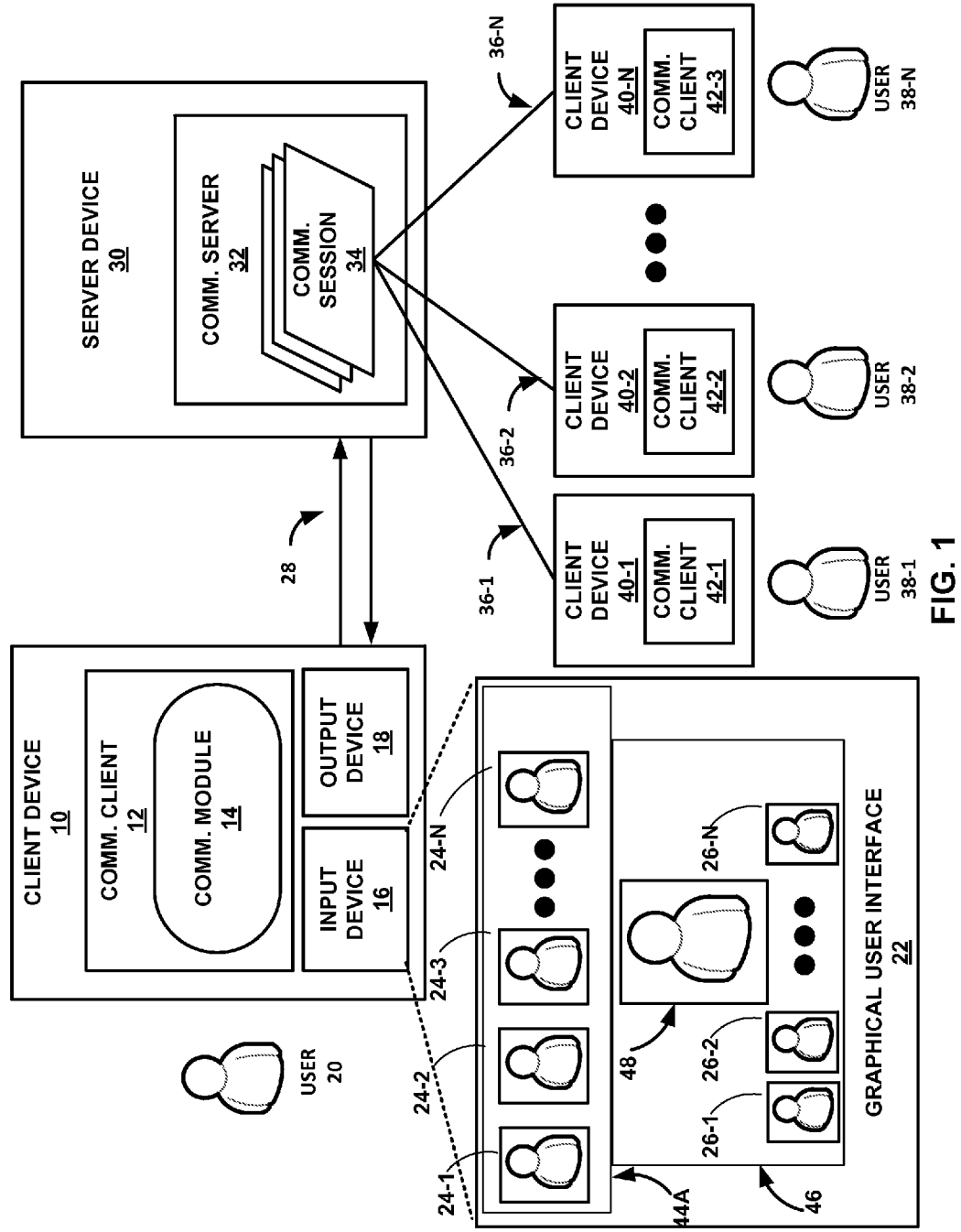
FIG. 1 is a block diagram illustrating an example of one or more client devices connected to a server device hosting a synchronous communication session that enables communication between users, in accordance with one or more aspects of the present disclosure.

FIG. 1 is a block diagram illustrating an example of one or more client devices 10 and 40-1 through 40-N connected to a server device 30 hosting a synchronous communication session that enables communication between users, in accordance with one or more aspects of the present disclosure. Client devices 10 and 40-1 through 40-N may be able to engage in a real-time video or audio synchronous communication session together. At least client device 10 may include a graphical user interface (GUI) 22 that assists a user of client device 10 with selecting or inviting other users of client devices 40 to participate in the synchronous communication session.

In the example of FIG. 1, one or more of client devices 40 of one or more users 38 are connected to synchronous communication session 34 hosted by server device 30 comprising communications server 32. In addition to synchronous communication session 34, communication server 32 may host additional communications sessions. As an example, client devices 10 and 40-1 through 40-N may be able to engage in a real-time video or audio synchronous communication session together. Each client device may include one or more output devices, which may display a graphical user interface. For example, at least client device 10 may include a graphical user interface (GUI) 22. The graphical user interface may display graphical representations of the one or more users connected to the synchronous communication session, as well as one or more users who may be available to engage in the synchronous communication session. A user may select one or more additional users not currently engaged in the current communications session using one or more input devices of a client device. GUI 22 may assist a user of client device 10 with selecting or inviting other users of client devices 40-1 through 40-N to participate in the synchronous communication session. Selecting the one or more available users may invite the one or more selected users to join the synchronous communication session. Or, if one of the selected users is engaged in a different synchronous communication session, the user may join the synchronous communication session of the selected user.

Examples of client devices 10 and 40-1 through 40-N (collectively referred to as "client devices 40" or "client computing devices 40"), may include, but are not limited to, stationary devices such as desktop computers, portable or mobile devices such as mobile phones (including smart phones), televisions with one or more processors embedded therein or coupled thereto, tablets, laptop computers, personal digital assistants (PDAs), portable gaming devices, portable media players, and e-book readers. Client devices 10 and each of client devices 40 may be the same or different types of devices. For example, client device 10 and client device 40-1 may both be mobile phones. In another example, client device 10 may be a mobile phone and client device 40-1 may be a desktop computer.

As illustrated in FIG. 1, client device 10 may communicate with server device 30 via a communication channel 28. Server device 30 may, for example, comprise one or more computing devices, and may include a communication server 32 that generates or maintains one or more synchronous communication sessions such as synchronous communication session 34. Synchronous communication sessions 34 may include users of client devices, such as users 38 of client devices 40, which are connected to synchronous communication session 34. A synchronous communication session, such as synchronous communication session 34 may include one or more objects, which may be stored in and/or are executable by hardware that may enable communication clients coupled to the one or more objects to exchange information. The one or more objects may include data and/or provide functionality of a synchronous communication session as described herein. The synchronous communication session 34 may include, e.g., a multi-user videoconference and/or a channel for sharing digital content, text message, etc. Various components described in FIG. 1 may include similar properties and characteristics as described throughout this disclosure.

Client device 10 of FIG. 1 may include a communication client 12, one or more input devices 16, and one or more output devices 18. Communication client 12 may further include a communication module 14 that causes output device 18 to display a graphical user interface 22. Communication module 14 may further include functionality that enables communication client 12 to connect to communication server 32 and join one or more synchronous communication sessions. Two or more client devices 40 (e.g., client device 10 and client device 40-1) may join the same synchronous communication session to enable communication, such as video and/or audio chat, between the two or more client devices 40.

Communication client 12 and communication server 32 may exchange audio, video, images, text, or other information. The information exchanged between communication client 12 and communication server 32 may be selected, at least in part, on the hardware and/or software capabilities of client device 10. For example, if client device 10 is a mobile device with relatively lower bandwidth and computing resource capabilities, communication server 32 may reduce the number and quality of the audio and/or video streams sent to client device 10 than if client device 10 was capable of higher bandwidth and had additional computing resource capabilities. Furthermore, communication client 12 may dynamically adjust the bit rate required to send the information to communication server 32 by, for example, reducing the quality of the audio and/or video being sent to communication server 32.

Output device 18 may display GUI 22 to a user 20 of client device 10. GUI 22 may include a number of user interface components, such as a communication window shown in FIG. 3. While a user, such as user 20, is engaged in a synchronous communication session, output device 18 may display a graphical representation of a synchronous communication session, such as synchronous communication session 34. The communication window may include graphical representations of one or more users who are engaged in a synchronous communication session. The graphical representations may be still images, such as icons, and/or photographs, video representations, geographic representations of the locations of the users and/or computing devices. The graphical representations displayed in the communication window may correspond to one or more users 38, who are engaged in synchronous communication session 34.

User 20 may select one or more of graphical representations 24 using an input device 16 to invite the one or more users or social circles corresponding to the selected graphical representations to join synchronous communication session 34. As an example, user 20 may interact with input device 16 to select, through live bar 44A, graphical representations 26-1 and 26-2 corresponding to users 38-1 and 38-2. In one example, user 20 may tap on a touch-sensitive screen over a touch-target associated with graphical representations 26-1 and 26-2. Detecting a touch of the touch-targets may select users 38-1 and 38-2 to send an invitation to synchronous communication session 34.

User 20 may also be engaged in more than one synchronous communication session at the same time. When user 20 is engaged in more than one synchronous communication session, selecting one or more graphical representations of users, such as graphical representations 24-1 of user 38-1, may result in output device 18 displaying a prompt or other interactive graphical user interface control. The prompt or other interactive GUI control may list currently active communications sessions that user 20 wishes to invite user 38-1 to. User 20 may have the option of inviting user 38-1 to one or more existing synchronous communication sessions, such as synchronous communication session 34, or to create a new synchronous communication session and invite user 38-1 to the new synchronous communication session.

Client device 10 may signal communication server 32 to request that communication server 32 signal client devices 40-1 and 40-2 of users 38-1 and 38-2 to join synchronous communication session 34. Client devices 40-1 and 40-2 may receive invites from communication server 32 to join synchronous communication session 34. Client devices 40-1 and 40-2 may display the invitation or otherwise indicate that users 38-1 and 38-2 are invited to join synchronous communication session 34, respectively. Users 38-1 and 38-2 may accept or reject the invitations to join synchronous communication session 34. Client devices 40-1 and 40-2 may signal the response of each user to communication server 32 over communication channels 36-1 and 36-2. Communication server 32 may send a signal to client device 10 of user 20 as to whether users 38-1 and 38-2 are to join synchronous communication session 34. As another example, user 20 may select the graphical representation of a social circle to invite one or more members of that social circle to engage in synchronous communication session 34. Inviting one or more users from a social circle is detailed further in the description of FIG. 3.

Communication server 32 may also notify one or more users engaged in synchronous communication session 34 when one or more new users have joined or left synchronous communication session 34 that the one or more users are engaged in. As an example, when user 38-1 joins synchronous communication session 34, communication server 32 may signal client device 10, which may in turn signal output device 18. Output device 18 may notify user 20 that user 38-1 has joined synchronous communication session 34. When one or more users leave synchronous communication session 34, communication server 32 may similarly signal one or more client devices, such as client device 10, that users 38-1 has left the synchronous communication session 34. Client device 10 may signal output device 10 to notify user 20 that users 38-1 and 38-1 have left synchronous communication session 34.

Graphical representations of users who are designated as available may appear in live bar 44A. A user may designate that he or she is available to engage in a synchronous communication session, such as synchronous communication session 34, in a variety of ways. For example, user 38-1 may be designated as being available to engage in a synchronous communication session by taking an action that indicates such availability. For instance, user 38-2 user may interact with a user interface control of a client device the user is using. For example, if user 38-2 is using client device 40-2, user 38-2 may interact with a virtual button displayed on an output device of client device 40-2, which causes client device 40-2 to signal communication server 32 that user 38-2 is available to engage in a synchronous communication session. As another example, user 38-2 may indicate availability to engage in a synchronous communication session by taking actions such as interacting with an input device, running an application, or logging in to a social network.

Similarly, an indication may be provided that a user is unavailable to participate in a synchronous communication session. For example, user 38-2 may indicate that he or she is unavailable to engage in a synchronous communication session by interacting with a virtual button displayed on an output device of client device 40-2, which causes client device 40-2 to signal communication server 32 that user 38-2 is unavailable. Also, communication server 30 may determine that user 38-2 is unavailable to engage in a session if user 38-2 has not met one or more criteria, such as an inactivity period, logged-in status, or a change in location. As an example, communication server 32 may determine that user 38-2 is unavailable to engage in a synchronous communication session because user 38-2 has not interacted with an input device of client device 40-2 in a specified period of time. As yet another example, communication server 32 may determine that user 38-2 is unavailable to engage in a synchronous communication session because user 38-2 has closed an application or logged out of a social network. As an example, server device 30 may also determine that user 38-2 of client device 40-2 is unavailable to engage in a synchronous communication session because user 38-2 has changed or is changing locations which may be reported by client device 38-2. An example of such a location change may be user 38-2 travelling from a residence to a business.

It may also be possible for a user, such as user 20, to block other users, such as users 38 from being notified regardless of whether user 20 is available to engage in a communications session. User 20 may enable a setting in an application that blocks one or more users 38 from being notified when user 20 is available to engage in a communications session. With this setting enabled, user 20 may not appear as a graphical representation displayed in a live bar of computing devices of other users 38 who are available to engage in a communications session. User 20 may select individual users who are not to be notified if user 20 is available, or user 20 may enable a setting that prevents any users from knowing when user 20 becomes or is available to engage in a synchronous communication session. If user 20 has blocked one or more users 38 from knowing when user 20 is available, user 20 may still engage in synchronous communication sessions. User 20 may, for example, invite user 38-1, who has been blocked from being notified that user 20 is available, to engage in a communications session.

As shown in FIG. 1, communication clients 42-1 through 42-N may enable users 38-1 through 38-N to join one or more synchronous communication sessions 34, respectively. Each of communication clients 42-1 through 42-N executing on client devices 40-1 through 40-N may include the same or similar functionality as communication client 12. As shown in FIG. 1, each of communication clients 42-1 through 42-N may participate in synchronous communication session 34.

In order to establish or join a synchronous communication session 34, user 20 may interact with GUI 22 to cause communication client 12 to generate a request to create a new synchronous communication session 34 or to directly create a new synchronous communication session 34. User 20 may create a new synchronous communication session by, for example, interacting with live bar 44A and selecting one or more users to invite to the synchronous communication session 34. Responsive to user 20 selecting a user to invite to join a synchronous communication session 34, communication client 12 may send a request to initiate a new synchronous communication session 34 to communication server 32.

User 20 may also wish to engage in synchronous communication session 34, at a later time. For example, user 20 may select an option to engage in synchronous communication session 34 at a later time. User 20 may select one or more users, such as users 38, to join synchronous communication session 34 at a designated start time. Users 38 may receive invitations to communication session 34 that will begin at a later time and may accept or reject the invitation. When communication session 34 is scheduled to start, the creator of communication session 34, in this example user 20, may automatically join synchronous communication session 34 or may be prompted to join synchronous communication session 34 at the designated start time. Similarly, if one of users 38, such as user 38-1, accepts the invitation, user 38-1 may be prompted to join, or may automatically join synchronous communication session 34 at the designated start time.

While user 20 is creating synchronous communication session 34, or at any time after the synchronous communication session 34 is created, user 20 may select additional users (for example, users 38-1 through 38-N) using live bar 44A to invite them to synchronous communication session 34. User 20 may select one or more different "circles" of contacts (for example, one or more groups of users connected to user 20), one or more other users connected to user 20, or any combination thereof to which to send an invitation to join synchronous communication session 34.

Users may also engage in synchronous communication session 34 without the use of a server device, such as server device 30. In this model, each client device, such as client devices 40, may each signal data to one another directly rather than indirectly through first sending data through a server device. As an example, user 38-1 may issue a user input indicating that the user is available to engage in synchronous communication session 34. Client device 40 of user 38-1 may receive the input and signal client device 10 of user 20 that user 38-1 is available. Client device 10 may maintain availability of users 38 and update graphical representations 24 to reflect the availability, which may be updated in real-time as client device 10 receives availability updates from client devices 40 of users 38.

To establish synchronous communication session 34, user 20 may select one or more graphical representations 24 using one or more input devices 16. Client device 10 may send an invitation to the client devices of the one or more selected users, such as users 38-1 and 38-2. Client device 10 may begin synchronous communication session 34. For the purposes of the example, users 38-1 and 38-2 accept the invitation, and join the synchronous communication session 34. One of the client devices of the users 38-1, 38-2, or 20 may host the synchronous communication session with each client device sending updates to the host of the synchronous communication session. Alternatively, the synchronous communication session may occur in a decentralized fashion with each client device signaling the other client devices of users involved in the synchronous communication session 34 with data such as voice, text, video, and/or other data.

User 20 may select one or more users from live bar 44A who are currently engaged in existing synchronous communication session to attempt to join those existing synchronous communication sessions. Responsive to user 20 attempting to join an existing synchronous communication session, communication client 12 sends a request to join the synchronous communication session to communication server 32. The request includes an identifier of the particular one of synchronous communication sessions 34 associated with the synchronous communication session. The identifier may be included in a join link for the synchronous communication session. A join link may be a hyperlink or another reference that when interacted with by a user. For example, a user selecting the link using an input device may cause communications client 12 to attempt to join the synchronous communication session specified by the identifier in the join link.

Example Client Device

Figure 2:
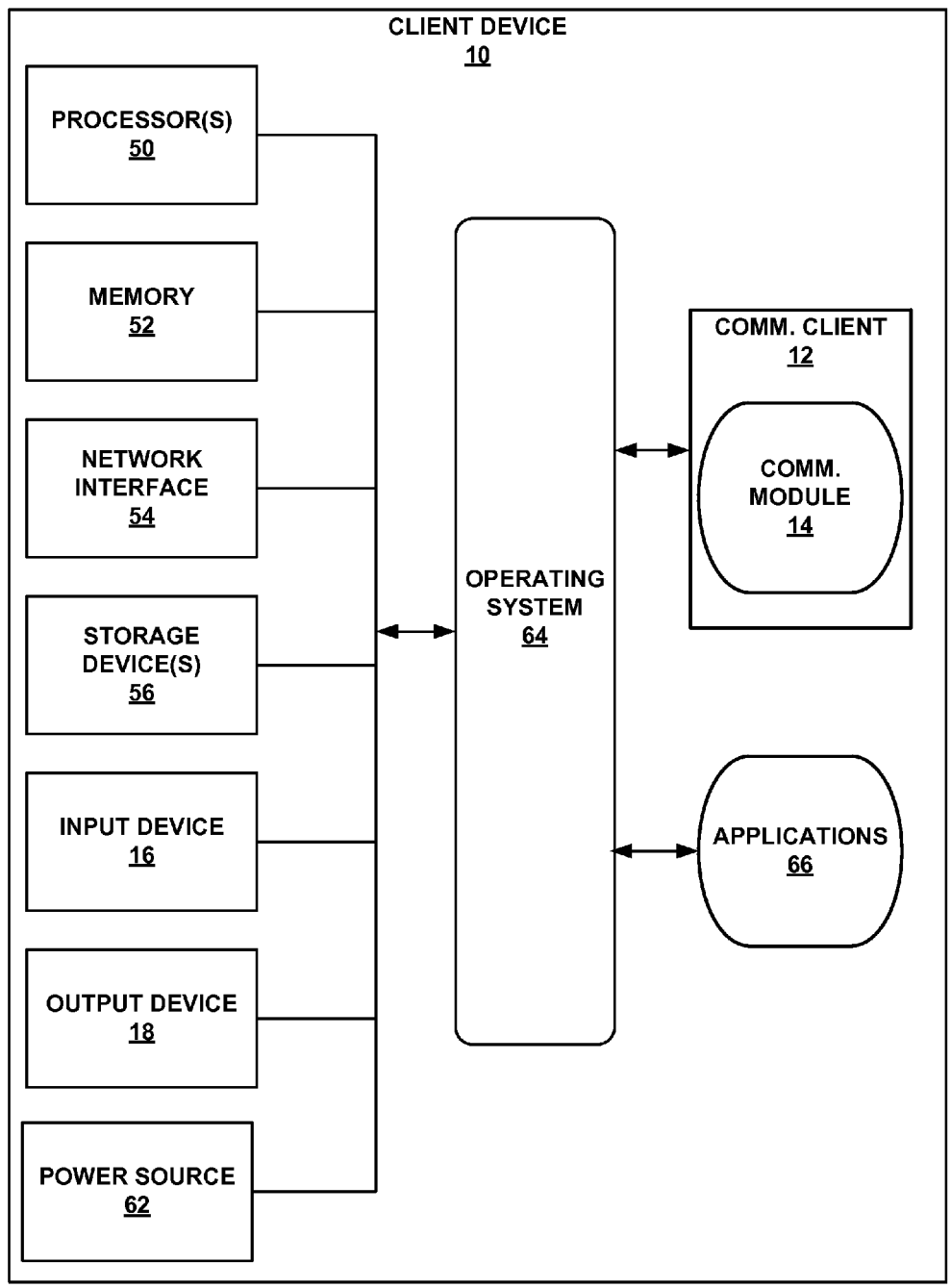
FIG. 2 is a block diagram illustrating further details of one example of a client device shown in FIG. 1, in accordance with one or more aspects of the present disclosure.

FIG. 2 is a block diagram illustrating further details of one example of a client device shown in FIG. 1, in accordance with one or more aspects of the present disclosure. FIG. 2 illustrates only one particular example of client device 10, and many other example embodiments of client device 10 may be used in other instances.

As shown in the specific example of FIG. 2, client device 10 includes one or more processors 50, memory 52, one or more network interfaces 54, one or more storage devices 56, one or more input devices 16, one or more output devices 18, and one or more power sources 62. Client device 10 also includes an operating system 64 that is executable by client device 10. Client device 10, in one example, further includes communication client 12 that is also executable by client device 10. Client device 10 may also include one or more additional applications 66. Each of components 50, 52, 54, 56, 16, 18, 62, 64, 66, and 12 may be interconnected (physically, communicatively, and/or operatively) for inter-component communications.

The one or more processors 50, in one example, may be configured to implement functionality and/or process instructions for execution within client device 10. For example, processors 50 may be capable of processing instructions stored in memory 52 or instructions stored on storage devices 56.

Memory 52, in one example, is configured to store information within client device 10 during operation. Memory 52, in some examples, is described as a computer-readable storage medium. In some examples, memory 52 is a temporary memory, meaning that a primary purpose of memory 52 is not long-term storage. Memory 52, in some examples, may be a volatile memory, meaning that memory 42 does not maintain stored contents when the computer is turned off. Examples of volatile memories include random access memories (RAM), dynamic random access memories (DRAM), static random access memories (SRAM), and other forms of volatile memories known in the art. In some examples, memory 52 is used to store program instructions for execution by processors 50.

Memory 52, in one example, is used by software or applications running on client device 10 (e.g., application 6 and/or one or more other applications 46) to temporarily store information during program execution.

Storage devices 56, in some examples, may also include one or more computer-readable storage media. Storage devices 56 may be configured to store larger amounts of information than memory 52. Storage devices 56 may further be configured for long-term storage of information. In some examples, storage devices 56 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Client device 10, in some examples, also includes one or more network interfaces 54. Client device 10, in one example, utilizes network interfaces 54 to communicate with external devices via one or more networks, such as one or more wireless networks. Network interface 54 may be a network interface card, such as an Ethernet card, an optical transceiver, a radio frequency transceiver, or any other type of device that can send and receive information. Other examples of such network interfaces may include Bluetooth®, 3G and Wi-Fi® radios in mobile computing devices as well as USB. In some examples, client device 10 utilizes network interface 54 to wirelessly communicate with an external device such as server device 30 of FIG. 1, a mobile phone, or other networked computing device.

Client device 10, in one example, also includes one or more input devices 16. Input devices 16, in some examples, may be configured to receive input from a user through tactile, audio, or video input. One or more input devices 16 may also be output devices. Examples of input device 16 include a presence-sensitive screen, a mouse, a keyboard, a voice responsive system, video camera, microphone, or any other type of device for detecting a command from a user. In some examples, a presence-sensitive screen includes a touch-sensitive screen.

A presence-sensitive is a screen, such as an LCD, plasma screen, CRT, or other display, which may detect when a user, such as user 20, is present at a computing device, such as client device 10. The presence-sensitive screen may include one or more cameras or other sensing devices for detecting the presence of the user. The presence sensitive screen may also detect one or more movements of the user, such as a gesture or other motion made by the user. In response to the presence of a user or an action or gesture made by the user, the computing device may take one or more actions.

One or more output devices 18 may also be included in client device 10. Output devices 18, in some examples, may be configured to provide output to a user using tactile, audio, and/or video output. One or more output devices 18 may also be input devices. Output device 18, in one example, includes a presence-sensitive screen, a speaker, a motor, and may utilize a sound card, a video graphics adapter card, and/or any other type of device for converting a signal into an appropriate form understandable to humans or machines. Additional examples of output device 18 include a touch sensitive screen, a cathode ray tube (CRT) monitor, a liquid crystal display (LCD), and/or any other type of device that can generate output to a user.

Client device 10, in some examples, may include one or more power sources 62, which may be rechargeable and provide power to client device 10. Power sources 62, in some examples, may be made from nickel-cadmium, lithium-ion, or other suitable material. One or more power sources 62 may be internal to client device 10, such as a battery, or may be an external power source.

Client device 10 may include operating system 64. Operating system 64, in some examples, may control the operation of components of client device 10. For example, operating system 64, in one example, facilitates the interaction of communication client 12 with processors 50, memory 52, network interfaces 54, storage devices 56, input devices 16, output devices 18, and power sources 62. As shown in FIG. 2, communication client 12 may include communication module 14 as described in FIG. 1. Communication client 12 and communication module 14 may each include program instructions and/or data that are executable by client device 10. For example, communication module 14 may include instructions that cause communication client 12 executing on client device 10 to perform one or more of the operations and actions described in the present disclosure.

In some examples, communication client 12 and/or communication module 14 may be a part of operating system 64 executing on client device 10. In some examples, communication client 12 may receive input from one or more input devices 16 of client device 10. Communication client 12 may, for example, receive audio or video information associated with a synchronous communication session from other computing devices participating in the synchronous communication session. As an example, communication client 12 may be one of a mobile application, or a web browser, or other similar client capable of communicating with a synchronous communication session. In an example where communications client 12 comprises a web browser, communication module 14 may comprise a browser extension that permits client device 10 to perform one or more of the operations and actions described in the present disclosure.

First Example User Interface

Figure 3:
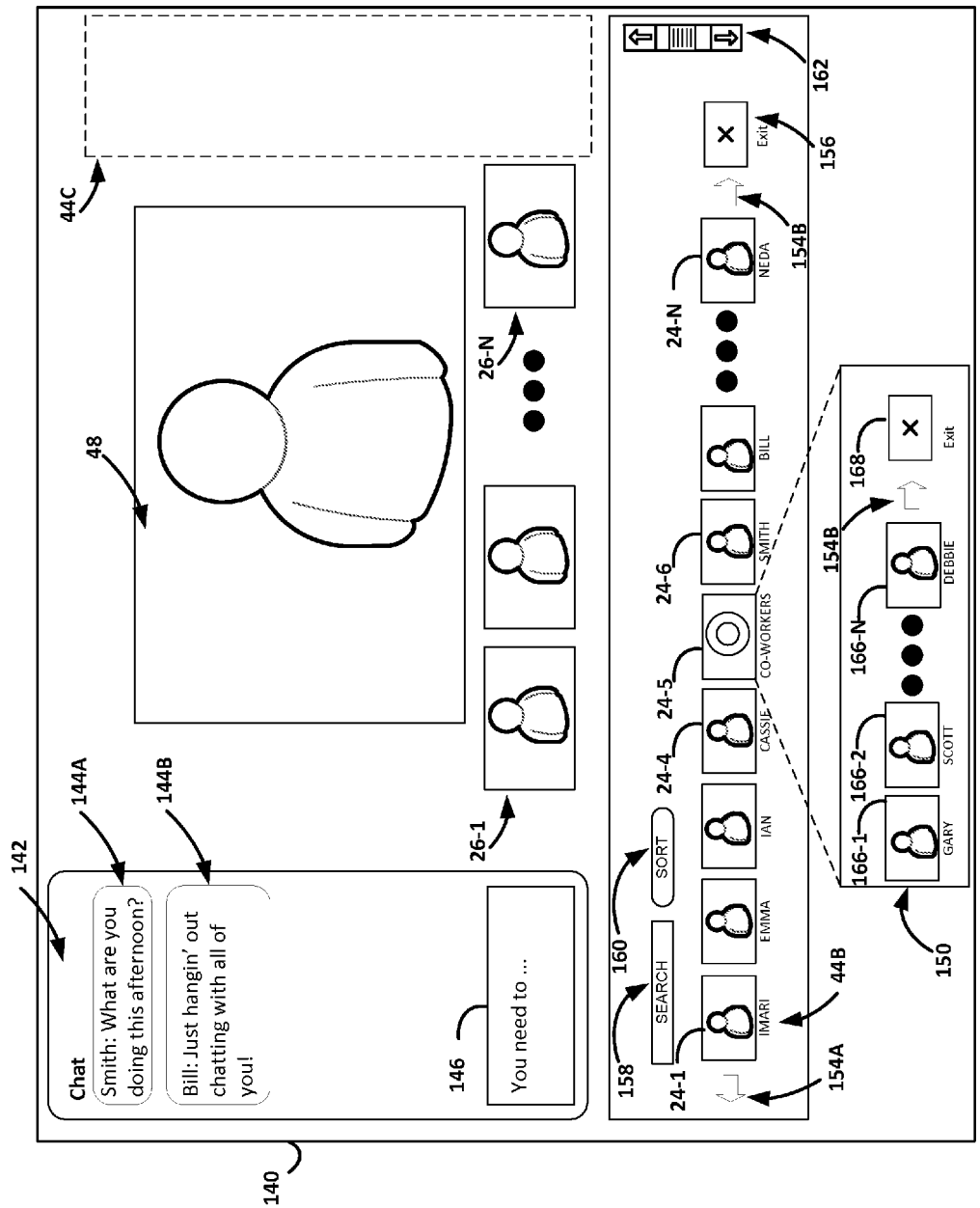
FIG. 3 is a conceptual diagram illustrating one example of a content item which may transition to a graphical representation of a synchronous communication session responsive to user input, in accordance with one or more aspects of the present disclosure.

FIG. 3 is a block diagram illustrating one example of a graphical display of a live bar and a synchronous communication session, in accordance with one or more aspects of the present disclosure. The graphical display of FIG. 3 may be described with respect to GUI 22 of client device 10 of FIGS. 1 and 2. However, the graphical display of FIG. 3 may be outputted using other devices.

In FIG. 3, a computing device, such as client device 10 of FIGS. 1 and 2, displays a GUI interface 140 for a synchronous communication session used for communicating with one or more users using at least one of text-based chat, audio-based communication, and video-based communication. A display associated with the communication session may include a number of graphically displayed features. These features may include graphical representations 26 of one or more participants in the synchronous communication session. One such feature may be a chat feature 142, including a chat history. As an example, chat feature 142 may include previous users' messages, such as messages 144A and 144B. Chat feature 142 may also include a field 146 where a user, such as user 20, can input text to the chat conversation.

GUI 22 may also display graphical representations 26-1 through 26-N that are associated with participants in the communication session. Graphical representations 26 may be of users who are currently participating in the communication session. Graphical representations 26 may be a combination of still image representations and video representations. For example, graphical representation 26-1 may be a video feed of that user, while graphical representation 26-2 may be a still image. Additionally, graphical representations may change from still images to videos and vice versa. For example, graphical representation 26-1 may initially appear as a real-time video feed of a user. However, the user associated with graphical representation 26-1 may desire privacy, and may disable his or her video camera. The client device associated with graphical representation of 26-1 may signal communication server 32 hosting synchronous communication session 34 that video has been disabled. Communication server 32 may signal one or more client devices of one or more users engaged in synchronous communication session 34 that graphical representation 26-1 no longer comprises a live video, and an output device 18 of client device 10 may display graphical representation 26-1 as a still image.

The graphical user interface associated with a synchronous communication session may also include a graphical representation 48 of one of the users engaged in the synchronous communication session. Graphical representation 48 may be larger than graphical representations 26. Graphical representation 48 may be of a user who is currently communicating with the other users in the synchronous communication session. When the user ceases communicating, and another begins communicating, graphical representation 48 may change to the graphical representation of a different user. As an example, user 38-1, who is associated with graphical representation 26-1 in the synchronous communication session, may speak into an input device, such as a microphone, to welcome users 38 to the synchronous communication session. While user 38-1 is speaking, graphical representation 48 may comprise a larger version of graphical representation 26-1. When user 38-1 has finished speaking, another user may begin speaking, for instance user 38-2, who is associated with graphical representation 26-1, and graphical representation 48 may change to comprise a larger version of graphical representation 26-1.

GUI 22 may also include live bar 44B. Live bar 44B may provide information to user 20 that may indicate what friends or other users or contacts are available to engage in a synchronous communication session. User 20 may be able to select one of the graphical representations 24-1 through 24-N to invite the user associated with that image to join a synchronous communication session. If the user is already in engaged in a synchronous communication session, user 20 may select the graphical image associated with the user or to join the synchronous communication session that the selected user is already engaged in. Once the selected user and user 20 are participating in the same synchronous communication session, the graphical representation of the selected user may be removed from live bar 44B.

As with graphical representations 26, graphical representations 24 may be still images (for example, icons) or video representations, such as live video feeds of the users associated with graphical representations 24. Graphical representations 24 may be a mix of still and video images and graphical representations 24 may change from a still image to a video image, and vice versa. Graphical representations 24 may also be representations of one or more social circles, such as a group of co-workers.

As shown in FIG. 3, graphical representation 24-5 represents a social circle comprising one or more users available to engage in a synchronous communication session. For example, the social circle associated with graphical representation 24-5 may be a group of co-workers. As an example, if user 20 interacts with graphical representation 22-5 of a social circle using one or more input devices 16, an output device 18 may display graphical representations 166 associated with the one or more users in the social circle. User 20 may invite the entire social circle including members of the social circle who are not currently designated as available, or one or more available users from the social circle to engage in a synchronous communication session. If one or more of the invited users is currently engaged in a synchronous communication session, user 20 may also join the synchronous communication session that one of the invited users from the social circle is currently engaged in.

User 20 may also interact with a graphical representation of a social circle, such as graphical representation 24-5, and output device 18 may display one or more users of the social circle who are available to engage in a synchronous communication session. Output device 18 may update live bar 44B to insert one or more of graphical representations 166-1 through 166-N in between the graphical representations immediately adjacent to graphical representation 24-5, in this case, graphical representations 24-5 and 24-6.

User 20 may also interact with graphical representation 24-5 and output device 18 may display a social circle window 150, which includes graphical representations 166-1 through 166-N (collectively referred to as "graphical representations 166"), where N is any nonnegative integer. Graphical representations 166 may correspond to users from the social circle represented by graphical representation 24-5 who are available to engage in a synchronous communication session. In some examples, graphical representations 166 associated with users who are members of the social circle represented by graphical representation 24-5 may be included even when they are currently unavailable. In such an example, an indication may be provided, such as graying out those graphical representations 166 associated with the unavailable users, which informs user 20 that the users are unavailable.

User 20 may interact with one or more user controls, such as scroll arrows 154A and 154B to scroll through graphical representations 166. User 20 may also interact with a user interface control, such as control 168 to hide or show social circle window 150. User 20 may also interact with graphical representation 24-5, for instance by hovering over graphical representation 24-5 using a mouse or other input device to cause output device 18 to display social circle window 150. When user 20 ceases interacting with graphical representation 24-5, such as by moving a mouse off of graphical representation 24-5 or by ceasing to touch graphical representation 24-5, output device 18 may hide social circle window 150.

Above, below, or adjacent to graphical representations 24, graphical user interface 140 may include usernames which identify the users associated with graphical representations 24. In one example, the usernames may comprise all or a portion of a person's actual name so that user 20 can identify one or more of users 38 included in live bar 44B. In another example, the usernames may be arbitrary and not related to a user's actual name.

Live bar 44B may include controls for scrolling through the users in live bar 44B in the horizontal and/or vertical directions. As an example, user 20 may scroll live bar 44B in the horizontal direction using user scroll arrows 154A or 154B, or vertically using a scrollbar 162. When user 20 scrolls live bar 44B in the horizontal or vertical directions, output device 18 may display additional graphical representations of users who are available to engage in a synchronous communication session. In some examples, client device 10 may not have a full list of users who are available to engage in a synchronous communication session. When user 20 scrolls and client device 10 attempts to display additional users who are available to engage in communications, client device 10 may query communications communication server 32 to determine if any additional users are available. If more users are available, communications server 32 may respond to client device 10 with one or more users who are available to engage in a synchronous communication session. Responsive to receiving the one or more additional users, communication device 10 may update live bar 44B with the additional graphical representations of the requested available users.

A live bar, such as live bar 44B, may also provide a search control 158 to allow searching data associated with available users. The associated data that may be searched may include a particular username, group, or characteristic. For example, the search may attempt to search the data associated with each graphical representation in a parallel fashion, or in a serial fashion. The results returned from the search may match the search input exactly or approximately. For example, user 20 may input words, characters, and/or other data into search control 158 using an input device 16. Responsive to a user input, client device 10 may signal communication server 32 to search for all users associated with user 20 who are available to communicate and have associated data that matches the search input either exactly or approximately. The search input may match the searched data approximately for example, when the input matches a portion of a piece of text data, a nearby geographic region if the search input is geographically related, or if the search input is within a threshold determined by another method, such as a search algorithm. Responsive to receiving a signal from communication server 32 with a list of users matching the search criteria, client device 10 may update output device 18 to show the graphical representations of the matching users in live bar 44B.

Due to the fact that the search input is word-based, users having associated word data that are not perfect matches with the search input or are similar to the search input or are somehow related to the search input may also be returned to client device 10 by communication server 32. User 20 may input a portion of a username or a person's real name, and output device 18 may update live bar 44B to include only users having matching names and who are available to engage in a synchronous communication session. A user may also search for available users having a particular interest, and live bar 44B may update to include users with those interests and who are available to engage in a synchronous communication session. In yet another example, user 20 may search for available users belonging to a particular group or social circle, and live bar 44B may update to include graphical representations of users who belong to that group or social circle.

A user may also be able to sort or rank the one or more available the users displayed in live bar 44B according to one or more relationship properties. User 20 may interact with a sort control 160 to sort or arrange graphical representations 22 according to the one or more criteria or relationships. These relationships may include a type of relationship between user 20 and the available users, a social circle, a number of times each of the one or more available users and the current user have engaged in previous synchronous communication session, a length of time each of the one or more users has been available for the synchronous communication session, a geographic distance between each of the one or more users, a time zone of the one or more users, and a length of time since the one or more users has engaged in a synchronous communication session. In one example, sort control 160 may be a drop-down menu.

As an example, user 20 may interact with sort control 160 using input device 16 and may choose to sort available users 38 according to the distance of each user from user 20. Client device 10 or communication server 34 may sort the users based on the distance between user 20 and each of available user 38, and client device 10 may update live bar 44B with graphical representations 24 arranged from farthest distance from user 20 to closest distance to user 20, closest distance from user 20 to farthest distance from user 20, or another ordering.

As another example, user 20 may interact with sort control 160 using input device 16 and may choose to sort available users 38 according to the length of time since user 20 has previously engaged in a conversation with each of available users 38. Client device 10 or communication server 34 may sort the users based on the length of time since user 20 has engaged with each of available users 38. Client device 10 may update live bar 44B with graphical representations 24 arranged from most recent conversation with user 20 to least recent conversation with user 20, least recent conversation with user 20 to most recent conversation with user 20, or another ordering.

A live bar may also allow a user to reorder the graphical representations of users using an input device. As an example, user 20 may select one or more of graphical representations 24 using input device 16 and reorder the representations by dragging the representations to a new location on the live bar. As another example, user 20 may select one of graphical representations 24 using input device 16 and move the selected graphical representation 24 to a location of a second graphical representation 24 of a second user. Client device 10 may swap the graphical representations at the first and second locations and update live bar 44B.

A user may resize, reposition, hide, or close live bar 44B. In some examples, user 20 may utilize input device 16 to interact with an edge of a window containing live bar 44B and drag the edge of the window to reform the shape of live bar 44B to a new set of dimensions. User 20 may also utilize an input device to interact with the edge of the window containing live bar 44B and drag the window to a new position. If the new position is located at the edge of GUI 140, output device 18 may resize live bar 44B to a different shape. If, for instance, user 20 moves live bar 44B to the right hand side of GUI 140, output device 18 may resize live bar 44B to a shape 44C, indicated in FIG. 3 by a dashed box. In addition, graphical representations 24 may be displayed in a top-to-bottom fashion rather than a left-to-right fashion shown in FIG. 3. In such an example, user 20 may scroll through graphical representations 24 using navigation controls in a top-to-bottom order.

As another example, user 20 may utilize one or more input devices 16 to interact with user interface control 156 to put live bar 44 in a hidden state. If live bar 44B is in a hidden state, only a portion of the window may be visible. Output device 18 may not display graphical representations 22, graphical controls 154A-154B, 158, 160, or 162. Hiding live bar 44B may also cause output device 18 to resize live bar 44B so that only a portion of live bar 44B is visible. For example, a hidden live bar 44B may be positioned at the edge of GUI 140. When in a hidden state, user 20 may utilize input device 16 to interact with a graphical control, such as control 156 to show the full live bar 44B. While in the hidden state, in some example, a notification may be outputted associated with live bar 44B, such as, for example, a notification indicating the composition of the available users has changed. In some examples, live bar 44B pops-up to a larger view when certain events occur while live bar 44B is in the hidden state. Such events may be a change in the composition of the available users or an available user initiating a synchronous communication session, for example.

Second Example User Interface

Figure 4:
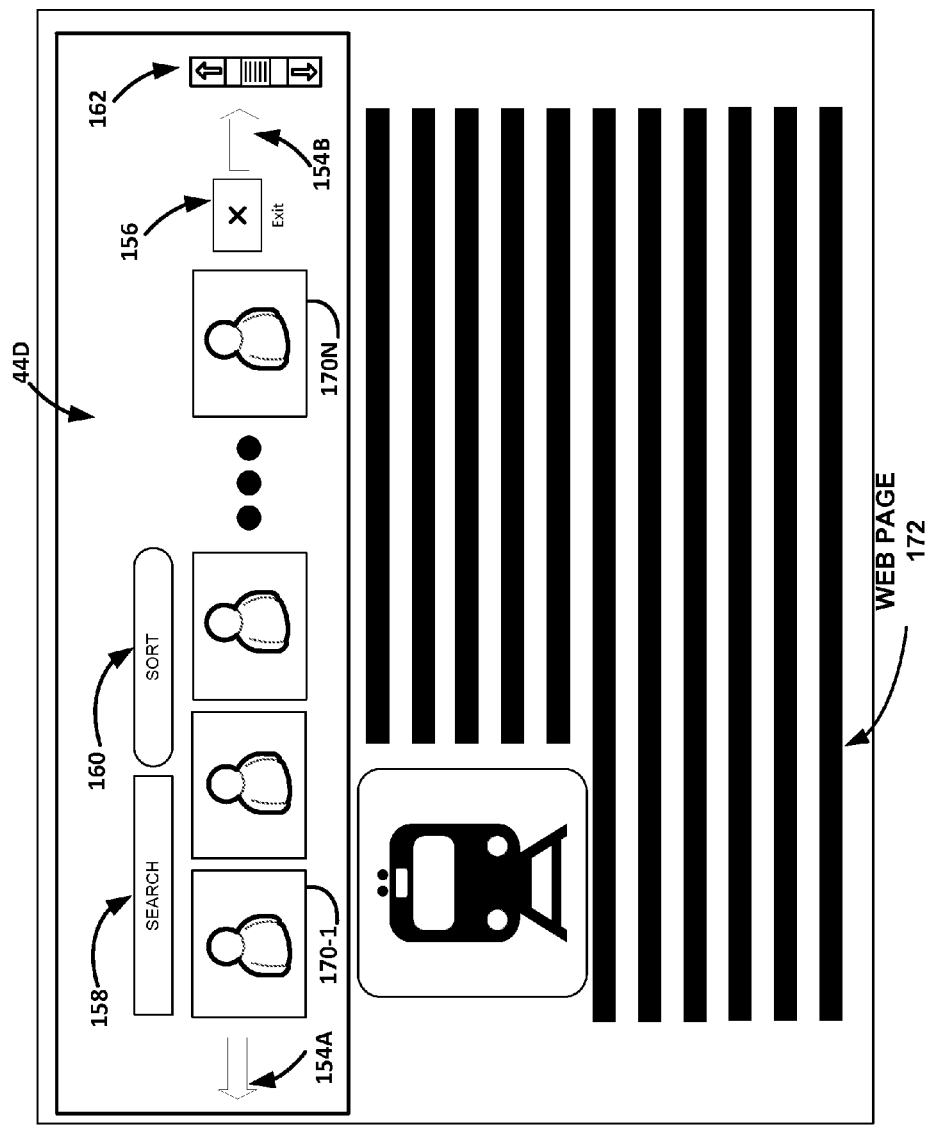
FIG. 4 is a flow chart illustrating an example method 200 of determining a topic of conversation for a synchronous communication session based on a content item, in accordance with one or more aspects of the present disclosure.

FIG. 4 is a block diagram illustrating one example of a graphical display of a live bar 44D, in accordance with one or more aspects of the present disclosure. The graphical display of FIG. 4 may be described with respect to GUI 22 of client device 10 of FIGS. 1 and 2. However, the graphical display of FIG. 4 may be outputted using other devices. As with live bar 44B of FIG. 3, a user interacts with one or more of graphical representations 170-1 through 170-N (collectively referred to as "graphical representations 170") to invite the one or more available users to a synchronous communication session.

Similar to FIG. 3, live bar 44D may include scroll arrows 154A and 154B, which a user may use to browse through graphical representations 170 of one or more available users. Live bar 44D may also include scroll bar 162 for scrolling vertically through graphical representations of one or more available users. Live bar 44D may also include a graphical control 156 that user 20 may interact with, using a device such as input device 16, to show, hide, or close, live bar 44D. As with live bar 44B of FIG. 3, a user may reposition live bar 44D. A user may also modify the dimensions of live bar 44D by utilizing an input device. A user may also interact with a search control 158 and a sort control 160 to search or sort the users on live bar 44D according to one or more properties associated with one or more users.

In FIG. 4, live bar 44D is displayed as an overlay in conjunction with a web page 172. Though displayed with web page 172 for the purposes of this example, live bar 44D may be displayed in conjunction with a variety of other applications and/or user interface components. For instance, a computing device may display live bar 44D in conjunction with an e-mail client, a phone dialing application, an office productivity suite, or any other application that a user may interact with on the computing device. In this figure, live bar 44D is illustrated as an overlay that is displayed in front of, or atop a web page. This overlay functionality of live bar 44D may allow a user of the computing device to engage in other tasks, such as surfing the Internet or making a phone call while still having access to live bar 44D. Live bar 44D may also be at least partially transparent or translucent. That is, a user may be able to view the contents of an underlying web page 172 or other content that is behind live bar 44D. This transparency functionality may facilitate user interaction with the portion of the application behind live bar 44D.

As stated above, the functionality of live bar 44D may be implemented in a variety of ways on a computing device. As examples, live bar 44D may be an extension or a plugin to a web browser, a standalone application, or a component of a web page. The plugin or extension may receive content for display, from one or more computing devices, such as communication server 32. A user may be able to download live bar 44D from an app store or from a website to a computing device, such as a mobile device, and launch the application whenever the user wishes to find available users to communication with. In the case of a mobile application, once the application has been initially launched, the application may execute in a background state until the user switches to the mobile application. While the application is executing in this background state, the computing device may reduce the power consumption of the application. In the case where live bar 44D is a component of a web page, live bar 44D may appear when is a user is logged in to a website that supports live bar functionality. A web browser may display live bar 44D when a user is checking e-mail in a browser, reading news, or using a social network, if those three sites support live bar integration. A browser extension may be installed on the computing device to enable live bar functionality. The extension could, for example, allow a user to utilize the functionality of a live bar, such as live bar 44D, whenever the user has a web browser open and on any website, not just those websites that support live bar functionality.

As with live bar 44B illustrated in FIG. 3, a user, such as user 20 may select one or more graphical representations from live bar 44D to invite the users associated with those representations to engage in a synchronous communication session. A communication server, such as communication server 32, may send invitations to those users to engage in the synchronous communication session via e-mail, through a message in a social network, or through another communication method. If one or more of the selected users is already engaged in a synchronous communication session, communication server 32 may invite user 20 to join one or more of the synchronous communication sessions, which are already in progress.

If one of the one or more invited users responds to an invitation, user 20 may receive a notification indicating whether the invited user has accepted or declined the invitation. If one or more of the invited users accepts an invitation, user 20 may create a new synchronous communication session. User 20 may opt to display the new synchronous communication session inside a window user 20 is currently viewing. User 20 may also opt to have the synchronous communication session displayed by the computing device in a new window. The new window may be a new browser window or the computing device may launch a separate application or process, and the computing device may display the synchronous communication session in the window of the separate application or process.

In addition to representing individual users, one or more of graphical representations 170 may represent a social circle. In some examples, user 20 may utilize input device 16 to interact with a graphical representation of a social circle. As described above, user 20 may select one or more social circles to invite the users of the social circle to a synchronous communication session, such as synchronous communication session 32. User 20 may also interact with the social circle to display one or more users of the social circle who are available to engage in conversation. The communications device may insert graphical representations of one or more of the users of the available users from the social circle into graphical representations 170 of live bar 44D. Or, the computing device may display the available users of the social circle in a social circle window, which user 20 may browse and select to invite to a synchronous communication session.

Example Method

Figure 5:
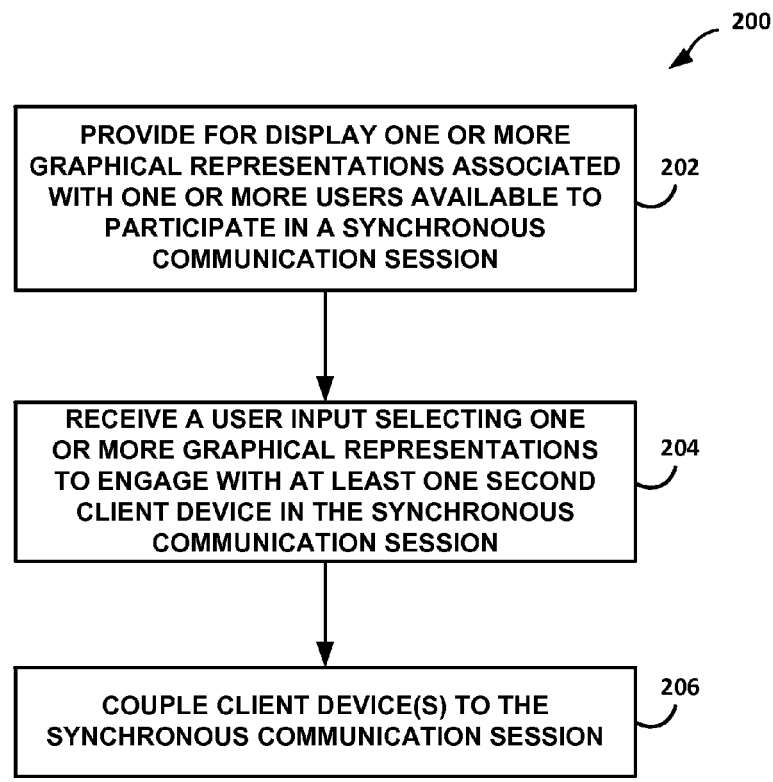
FIG. 5 is a flow chart illustrating an example method 200 of providing a live bar in a synchronous communication session, in accordance with one or more aspects of the present disclosure.

FIG. 5 is a flow chart illustrating an example method 200 of providing a live bar in a synchronous communication session, in accordance with one or more aspects of the present disclosure. In some examples, method 200 may be performed by client device 10 of FIGS. 1 and 2. The live bar may be live bars 44A-44D of FIGS. 1, 3, and 4. A synchronous communication session may be a video chat, an audio chat, or a live text-based chat, for example.

Method 200 may include providing for display at a first client device, using one or more computing devices, one or more graphical representations associated with one or more users available to participate in a synchronous communication session that enables communication between different client devices (202). Method 200 may include receiving, using the one or more computing devices, from the first client device, a selection of at least one of the one or more graphical representations to engage with at least one second client device corresponding to the at least one selected graphical representations in a synchronous communication session (204). Method 200 may further include, responsive to receiving the selection of the at least one of the one or more graphical representations, coupling, using the one or more computing devices, the first client device to the synchronous communication session, wherein coupling the first client device to the synchronous communication session allows the first client device to communicate with at least the second client device associated with the at least one selected graphical representation, wherein at least the second client device is coupled to the synchronous communication session (206).

As an example of method 200, coupling the first client device to the synchronous communication session may comprise coupling the first client device to a pre-existing synchronous communication session. The pre-existing synchronous communication session may be hosted by a server device, such as server device 30 of FIG. 1, which may comprise communications server 32 further comprising the synchronous communications session 34, and which may include one or more computing devices. The synchronous communication session may also not be hosted by a server device but rather on a peer-to-peer basis, where each client device, such as client devices 40, involved in the synchronous communication session transmits data to all other client devices involved in the communication session directly, rather than through a through a central server. A user may join a pre-existing communication session because other associated users may already be engaged in the communication session.

In an example of method 200, coupling the first client device may comprise initiating a new synchronous communication session, such as communication session 34. The method may further comprise sending an invitation, using the one or more computing devices, to a computing device associated with at least one user corresponding to the at least one selected graphical representations to join the new synchronous communication session. A user may initiate a new synchronous communication session generally to be able to engage with other users in a real-time or more instantaneous manner. The user may also initiate a new synchronous communication session. For instance, if the first user cannot join an existing session with other users that the user desires in order to hold a meeting, or if the user wants to be able to moderate the communication session, the user may initiate a new synchronous communication session.

In another example of method 200, receiving a selection of the at least one of the one or more graphical representations may comprise receiving, using the one or more computing devices, an indication of a detection of a touch of a touch-target associated with the at least one of the one or more selected graphical representations. A touch target may be a graphical representation that a user may interact with on a touch-sensitive or presence-sensitive screen. The graphical representation may be an icon, link, user interface control, menu item, form field, or another user interface component or application component that a user may interact with and that a client device may respond to in some manner. In response to a user interacting with a touch target, a client device may allow the user to drag the contents of the target, may allow the user to change a view displayed on an output device, may display a menu, or cause the client device to take another similar action. A touch-sensitive screen may be a screen such as a touchpad, such as a capacitive or resistive touchpad, or another similar device that accepts input from the touch of a user or a device designed to work with the touch-sensitive screen, such as a stylus.

Method 200 may further comprise accepting, using the one or more computing devices, a request to connect from the first client device, hosting, using the one or more computing devices, the synchronous communication session between the one or more computing devices, the first client device, and the at least a second client device, and sending, using the one or more computing devices, signals related to the communication session to the first client device and to the at least a second client device.

In another example, the one or more users comprises a first user, and method 200 further comprises receiving, using the one or more computing devices, a signal indicating that the first user is available, and responsive to receiving the signal indicating the first user is available, designating, using the one or more computing devices, the first user as available to participate in the synchronous communication session.

In method 200, a user of the first client device may comprise a first user, such as user 38-1. The method may further comprise arranging, using the one or more computing devices, the one or more graphical representations of the one or more users available to participate in the synchronous communication session based on one or more characteristics. The one or more characteristics may include a type of relationship between each of the one or more users and the first user, a social circle comprising one or more users associated with the first user by a social relationship, a number of times each of the one or more users and the first user have engaged in previous synchronous communication sessions, a length of time each of the one or more users has been available for the synchronous communication session, a geographic distance between each of the one or more users, one or more time zones of the one or more users, and a length of time since each of the one or more users have engaged in a synchronous communication session.

The one or more graphical representations, such as graphical representations 24 of FIG. 1 may be at least one of a video representation of at least part of a user, such as user 38-1. The representations may also comprise a still image representation of user 38-1, an animated image, a geographic representation of the location of the user 38-1, a video sequence, and an indication of the recent activity of the user 38-1. In some examples, a video representation of part of user 38-1 may be a live video feed of the user's face so that a different user who is viewing the representation of user 38-1, such as user 20, may be able to determine who user 38-1 is by viewing the video feed associated with user 38-1.

In method 200, providing for display at the first client device the one or more graphical representations of one or more users available to participate in the synchronous communication session may comprise a scrollable list of the graphical representations. The scrollable list of the graphical representations may further comprise at least one of a user-name for each of the one or more users associated with the graphical representations, one or more controls for displaying the graphical representations, one or more controls for scrolling through the scrollable list, and an input field to search characteristics of the one or more users. The one or more graphical representations may span horizontally with respect to one another across a portion of a display of the computing device.

A still image representation of a user, such as user 38-1, may be a digital photograph of the user, an icon, or another image that may be selected by a user or by a server. Similarly, an animated image representation of the user may be a series of digital photographs of the user, which may be displayed in sequence by an output device, such as output device 18 of FIG. 1, to give the appearance of motion. The animated representation may also be digital photographs taken and updated regularly. The animated representation may also be other images not of a user. The images may be chosen by a user or by a server.

A geographic graphical representation of a user may indicate where a user is located. The graphical representation may display an indication, such as a pinpoint on a map, of where the user is located in the world. The graphical representation may be determined using GPS functionality of a mobile computing device, such as a smart phone, or other GPS-equipped device, for example. A geographic graphical representation may also indicate a residence, business, or other landmark that the user is near. As an example, if the user enters a coffee shop, the graphical representation may indicate the name and location of the coffee shop.

A graphical representation of recent activity of a user may indicate a type of activity a user, such as user 38-1, has engaged in. The graphical representation may indicate that a user is currently or has previously engaged in a particular type of communication session. The graphical representation may indicate the most recent type of type of activity a user has engaged in. Types of activities may include any combination of engaging in a chat session, engaging in an audio conversation, or engaging in a video conference. The type of activity may be denoted by displaying an icon in front of the graphical representation of the user. The icon may be a microphone, video camera, or keyboard, or any other icon that indicates an activity that a user has engaged in.

In another example, one or more computing devices, such as server device 30, may receive an indication that a first user, such as user 38-1 is available to participate in the synchronous communication session. In response to receiving the indication, server device 30 may provide for display at client device 10 a graphical representation of the first user as one of the one or more graphical representations.

In another example, the computing device, for example server device 30 of FIG. 1, may receive an indication that a first user, such as user 38-1, is unavailable to participate in the synchronous communication session, such as synchronous communication session 34. Responsive to receiving the indication, server device 30 may remove a graphical representation, such as graphical representation 24-1, of the first user from the one or more graphical representations.

The graphical representations of one or more users, such as graphical representations 24, may further comprise a navigable list of the graphical representations of the one or more users. Server device 30 may receive an order command. The order command identifies at least one criterion for arranging the navigable list of graphical representations. Responsive to receiving the order command, server device 30 arranges the navigable list of graphical representations according to the at least one criteria. Example criteria may include alphabetical ordering, ordering based on one or more social circles the users from the list are associated with, and/or an ordering based on another characteristic associated with the users.

In another example, the graphical representations of one or more users may further comprise a navigable list of the graphical representations of one or more users. A computing device, such as computing device 10 of FIG. 1, or a server, such as server device 30, may receive a search command from a user input of a user, such as user 20. The search command may identify at least one characteristic. Responsive to the search command, a computing device, such as client device 10 or server device 30, may search the list of graphical representations of the one or more users according to the at least one characteristic. One or more users that meet the at least one characteristic may also be identified by the computing device.

One or more of the graphical representations of one or more users, such as graphical representation 22-5 of FIG. 2, may also comprise a graphical representation of a social circle. Server device 30 may select one or more users to engage with in a synchronous communication session. Selecting the one or more users may also comprise server device 30 selecting all the users in a social circle of the user, such as the users associated with graphical representations 166 of the members of the social circle, to engage with in the synchronous communication session.

In another example, server device 30 may provide for display a second graphical representation, such as graphical representation 48 of FIG. 1 in conjunction with the graphical representations of the one or more users, such as graphical representations 24. The second graphical representation may be an example of an image associated with a user currently engaged in synchronous communication session 34.

Server device 30 may also provide the one or more graphical representations of the one or more users 24 for display at client device 10 as graphical output of executing an extension or a plugin of a web browser by client device 10. User 20 may, for example, download and install the extension, which works within or in conjunction with a web browser or another application. The graphical output of executing the extension may display the one or more graphical representations of users available to engage in a communication session while the user has the web browser displayed on the client device.

The techniques described in this disclosure provide a first user the ability to more accurately determine one or more users who are available to engage in a communication session by having those users indicate their availability to engage in a communications session. Based on the availability by the one or more users, a computing device may display graphical representations of the one or more available users. The first user may select one or more of the graphical representations of the one or more available to users to invite the users associated with the one or more selected representations to a communication session, or to join a communication session that the one or more selected users are currently engaged in.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium encoded with instructions. Instructions embedded or encoded in an article of manufacture including an encoded computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, computer-readable storage media may comprise a tangible or non-transitory media. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. Aspects or features of examples described herein may be combined with any other aspect or feature described in another example. These and other embodiments are within the scope of the following claims.

What is claimed is:

1. A computer-implemented method for indicating user availability, the method comprising:
    providing for display at a first client device associated with a first user, by at least one of one or more computing devices, one or more graphical representations associated with one or more users available to participate in a first synchronous communication session that enables communication between different client devices;
    receiving, by at least one of the one or more computing devices, from the first client device, a selection of a graphical representation of a second user to engage with a second client device in the first synchronous communication session;
    determining that the second user is currently engaged in a second synchronous communication session that is different from the first synchronous communication session; and
    responsive to receiving, from the first client device, the selection of the graphical representation of the second user to engage with the second client device in the first synchronous communication session, determining that the second user is currently engaged in the second synchronous communication session that is different from the first synchronous communication session, coupling, by at least one of the one or more computing devices, the first client device to at least one of the first and second synchronous communication sessions, wherein coupling the first client device to the at least one of the first and second synchronous communication sessions allows the first client device to join the second synchronous communication session and communicate with the second client device in the second synchronous communication session.

2. The method of claim 1, wherein receiving, from the first client device, the selection of the graphical representation of the second user further comprises selecting a graphical representation of a social group and selecting the second user from available users of the social group.

3. The method of claim 1, wherein coupling the first client device to the at least one of the first and second synchronous communication sessions comprises initiating the first synchronous communication session, and wherein the method further comprises:
    sending an invitation, by at least one of the one or more computing devices, to the second client device to join the first synchronous communication session.

4. The method of claim 1, wherein receiving the selection of the graphical representation of the second user comprises receiving, by at least one of the one or more computing devices, an indication of a detection of a touch of a touch-target associated with the selected graphical representation.

5. The method of claim 1, further comprising:
    accepting, by at least one of the one or more computing devices, a request to connect from the first client device,
    hosting, by at least one of the one or more computing devices, the first synchronous communication session between at least one of the one or more computing devices, the first client device, and the second client device; and
    sending, by at least one of the one or more computing devices, signals related to the first synchronous communication session to the first client device and to the second client device.

6. The method of claim 1, wherein the one or more users comprises a third user, and wherein the method further comprises:
    receiving, by at least one of the one or more computing devices, a signal indicating that the third user is available; and
    responsive to receiving the signal indicating that the third user is available, designating, by at least one of the one or more computing devices, the third user as available to participate in the first synchronous communication session.

7. The method of claim 1 wherein the method further comprises:
    arranging, by at least one of the one or more computing devices, the one or more graphical representations of the one or more users available to participate in the first synchronous communication session based on one or more characteristics; and
    wherein the one or more characteristics include a type of relationship between each of the one or more users and the first user, a social group comprising the one or more users associated with the first user by a social relationship, a number of times each of the one or more users and the first user have engaged in previous synchronous communication sessions, a length of time each of the one or more users has been available for the first synchronous communication session, a geographic distance between each of the one or more users, one or more time zones of the one or more users, and a length of time since each of the one or more users has engaged in a previous synchronous communication session.

8. The method of claim 1, wherein providing for display at the first client device the one or more graphical representations associated with the one or more users available to participate in the first synchronous communication session comprises providing for display, by at least one of the one or more computing devices, a scrollable list of the graphical representations,
    wherein the scrollable list of the graphical representations further comprises at least one of a username for each of the one or more users associated with the graphical representations, one or more controls for displaying the graphical representations, one or more controls for scrolling through the scrollable list, and an input field to search characteristics of the one or more users, and wherein the one or more graphical representations span horizontally with respect to one another across a portion of a display of the one or more computing devices.

9. The method of claim 1, wherein the graphical representation of the second user comprises at least one of a video representation of at least part of the second user, a still image representation of the second user, an animated image, a geographic representation of a location of the second user, a video sequence, and an indication of a recent activity of the second user.

10. The method of claim 1, wherein the first synchronous communication session comprises at least one of a video chat and a live text-based chat.

11. The method of claim 1, further comprising:
receiving, by at least one of the one or more computing devices, an indication that a third user is available to participate in the first synchronous communication session; and
responsive to receiving the indication, providing for display at the first client device, by at least one of the one or more computing devices, a graphical representation of the third user in the one or more graphical representations.

12. The method of claim 1, further comprising:
receiving, by at least one of the one or more computing devices, an indication that a third user is unavailable to participate in the first synchronous communication session; and
responsive to receiving the indication, indicating for removal at the first client device, by at least one of the one or more computing devices, a graphical representation of the third user from the one or more graphical representations.

13. The method of claim 1, wherein the one or more graphical representations of the one or more users comprise a navigable list of the graphical representations of the one or more users, and wherein the method further comprises:
receiving, by at least one of the one or more computing devices, from the first client device, an order command that identifies at least one criterion for arranging the navigable list of the graphical representations; and
responsive to receiving the order command, by at least one of the one or more computing devices, arranging the navigable list of the graphical representations according to the at least one criterion.

14. The method of claim 1, wherein the one or more graphical representations of the one or more users comprise a navigable list of the graphical representations of the one or more users, further comprising:
receiving, by at least one of the one or more computing devices, a user input indicating a search command that identifies at least one characteristic;
responsive to receiving the search command, searching, by at least one of the one or more computing devices, data associated with the navigable list of the graphical representations according to the at least one characteristic; and
identifying, by at least one of the one or more computing devices, at least one user of the one or more users having at least one associated characteristic that approximately matches the at least one characteristic.

15. The method of claim 1, wherein the one or more graphical representations of the one or more users comprise a graphical representation of a social group.

16. The method of claim 15, further comprising selecting, by at least one of the one or more computing devices, all of the graphical representations associated with the social group to engage with in the first synchronous communication session.

17. The method of claim 15,
wherein the graphical representations associated with the social group include all members of the social group that are available in the first synchronous communication session.

18. The method of claim 1, further comprising:
providing for display at the first client device, by at least one of the one or more computing devices, the one or more graphical representations of the one or more users as graphical output of an extension or a plugin of a web browser executed by the first client device.

19. A non-transitory computer-readable storage medium comprising instructions for causing at least one programmable processor to perform operations comprising:
providing for display at a first client device associated with a first user, by at least one of one or more computing devices, one or more graphical representations associated with one or more users available to participate in a first synchronous communication session that enables communication between different client devices;
receiving, by at least one of the one or more computing devices, from the first client device, a selection of a graphical representation of a second user to engage with a second client device in the first synchronous communication session;
determining that the second user is currently engaged in a second synchronous communication session that is different from the first synchronous communication session; and
responsive to receiving, from the first client device, the selection of the graphical representation of the second user to engage with the second client device in the first synchronous communication session, determining that the second user is currently engaged in the second synchronous communication session that is different from the first synchronous communication session, coupling, by at least one of the one or more computing devices, the first client device to at least one of the first and second synchronous communication sessions, wherein coupling the first client device to the at least one of the first and second synchronous communication sessions allows the first client device to join the second synchronous communication session and communicate with the second client device in the second synchronous communication session.

20. The computer-readable storage medium of claim 19, wherein the instructions that cause the at least one programmable processor to couple the first client device to the at least one of the first and second synchronous communication sessions further comprise instructions that, when executed, cause the at least one programmable processor to perform operations comprising:
sending, by at least one of the one or more computing devices, to the second client device to join the first synchronous communication session.

21. The computer-readable storage medium of claim 19, wherein the instructions that cause the at least one programmable processor to couple the first client device to the at least one of the first and second synchronous communication sessions further comprise instructions that, when executed, cause the at least one programmable processor to perform operations comprising:
receiving, by at least one of the one or more computing devices, a signal indicating that a third user is available; and responsive to receiving the signal indicating that the third user is available, designating, by at least one of the one or more computing devices, the third user as available to participate in the first synchronous communication session.

22. A computing device, comprising:
a network interface to connect to a first synchronous communication session that enables communication between users of different computing devices;
a display device that displays one or more graphical representations of one or more users available to participate in the first synchronous communication session;
an input device configured to receive, by a user interface of the computing device, a user input from a first user selecting a graphical representation of a second user to engage with a second client device in the first synchronous communication session; and
one or more processors configured to determine that the second user is currently engaged in a second synchronous communication session that is different from the first synchronous communication session, and to allow the first user to join the second synchronous communication session responsive to receiving the user input from the first user selecting the graphical representation of the second user to engage with the second client device in the first synchronous communication session and determining that the second user is currently engaged in the second synchronous communication session that is different from the first synchronous communication session.

23. The computing device of claim 22, wherein the network interface is further configured to send an invitation to another computing device associated with the second user to join the first synchronous communication session.

24. The computing device of claim 22, wherein the network interface is further configured to receive a signal indicating that a third user is available, and responsive to receiving the signal indicating that the third user is available, designate the third user as available to participate in the first synchronous communication session.

* * * * *